United States Patent
Yamamoto et al.

[11] Patent Number: 6,003,338
[45] Date of Patent: *Dec. 21, 1999

[54] MOLDING METHOD FOR OPTICAL ELEMENT

[75] Inventors: Kiyoshi Yamamoto; Takeshi Nomura; Sunao Miyazaki, all of Yokohama; Masashi Mashige, Kawasaki, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/690,869

[22] Filed: Aug. 1, 1996

[30] Foreign Application Priority Data

Aug. 4, 1995 [JP] Japan ................... 7-199533

[51] Int. Cl.[6] ............... C03B 21/00; C03B 23/00; C03B 25/00; C03B 27/00

[52] U.S. Cl. ............... 65/102; 65/111; 65/305; 65/275; 65/319; 264/1.1

[58] Field of Search .................. 65/102, 111, 305, 65/275, 319, 122; 264/1.1

[56] References Cited

U.S. PATENT DOCUMENTS

| | | | |
|---|---|---|---|
| 3,833,347 | 9/1974 | Angle et al. | 65/32 |
| 3,844,755 | 10/1974 | Angle et al. | 65/32 |
| 4,435,200 | 3/1984 | Joormann et al. | 65/64 |
| 4,734,118 | 3/1988 | Marechal et al. | 65/102 |
| 5,032,160 | 7/1991 | Murata et al. | 65/102 |
| 5,188,650 | 2/1993 | Nomura | 65/64 |
| 5,192,352 | 3/1993 | Kuwabara et al. | 65/60.53 |
| 5,344,476 | 9/1994 | Tomida | 65/102 |

FOREIGN PATENT DOCUMENTS

| | | |
|---|---|---|
| 58-84134 | 5/1983 | Japan . |
| 59-203732 | 11/1984 | Japan . |
| 62-27334 | 2/1987 | Japan . |

Primary Examiner—James Derrington
Assistant Examiner—Jacqueline A. Ruller
Attorney, Agent, or Firm—Fitzpatrick, Cella, Harper & Scinto

[57] ABSTRACT

A molding method for optical element is disclosed in which a glass material prepared for weight is introduced into a mold and then heated to soften, and subsequently pressed with the mold to mold an optical element. The glass material is heated to have a viscosity of $10^5$ to $10^7$ dPaS and press-molded with the mold having a temperature equivalent to a viscosity of $10^9$ to $10^{11}$ dPaS of the glass material.

4 Claims, 7 Drawing Sheets

MOLDING METHOD FOR OPTICAL ELEMENT

BACKGROUND OF THE INVENTION

1. Field of the Invention

The present invention relates to a molding method for an optical element, where a glass material is heated to be softened and then press-molded within a mold.

2. Related Background Art

Recently, there has been developed a method in which a glass material for an optical element, such as a glass blank pre-formed to have some degree of surface accuracy and configuration, is put in a mold having a given surface accuracy, and press-molded while heating to thereby produce an optical element having a high-accuracy optical functional surface, with no need for post-processing such as grinding and polishing.

Generally, in such a press molding method, upper and lower molding members are disposed vertically to be opposed to each other so as to be slidable in a shell mold. A glass material to be molded is introduced into a cavity defined by the upper, lower, and shell molding members, and these molding members are heated to a given temperature suited for molding, i.e., a temperature at which the glass material shows a viscosity of $10^8$ to $10^{12}$ dPaS, depending upon materials, and subsequently the mold is closed and the introduced glass material is pressed for an appropriate amount of time, so that the shape on the molding surfaces of the molding members are transferred onto the surface of the glass material. In this case, upon molding the environment therein is made to be a non-oxidizing atmosphere such as a nitrogen atmosphere in order to prevent oxidation of these molding members.

Thereafter, the molding members are cooled to a temperature sufficiently close to the transition temperature of the glass material to be molded, and then the mold is opened and the pressing pressure is released to take out a molded optical element.

Prior to the introduction into the mold, the glass material to be molded may also be pre-heated to the appropriate temperature, or after heating to a temperature suitable for molding, the glass material may also be introduced into the mold. Moreover, continuous molding is performed in such a manner that the glass material to be molded, together with the molding members, are conveyed to a pressing machine, and then are respectively heated at given locations and are press-molded by the pressing machine, or are further cooled. These methods can speed molding.

The above-described optical element press molding methods have been disclosed by U.S. Pat. Nos. 3,833,347 and 3,844,755 and Japanese Patent Application Laid-Open No. 58-84134 and others, wherein a glass material is introduced in advance into a mold and subsequently the molding members and the glass material are heated to an isothermal condition and the press molding is completed at a given temperature. In addition, Japanese Patent Application Laid-Open Nos. 59-203732 and 62-27334 and others disclose a method in which a glass material heated to a temperature suited for molding is transferred into a mold whose temperature is maintained below the glass material temperature.

However, the above-described prior art contain the following problems. First of all, in a method disclosed by Japanese Patent Application Laid-Open No. 58-84134 and other, when a glass material is placed in advance within a mold where molding members and the glass material are heated to an isothermal condition, the proper range of temperature for press-molding corresponds to a glass viscosity of $10^9$ to $10^{9.5}$ dPaS.

This is because, when the temperature is below a value corresponding to $10^{9.5}$ dPaS, the glass is broken or a long time is required for the deformation on press molding, thus such temperature is not practical from a productivity standpoint, on the other hand, when the temperature is more than that equivalent to $10^9$ dPaS, poor conditions such as fusion to the mold surface and cloudiness on the transferred surfaces is apt to occur. Accordingly, the general pressing time is approximately 30 seconds to 10 minutes, and the cycle time becomes considerably longer because, after the completion of the deformation of the glass material by pressing, the glass material is cooled to within a temperature range in which its configuration does not change, and then released from the mold.

Furthermore, Japanese Patent Application Laid-Open No. 59-203732 discloses a method in which a glass material is placed on a holding member and heated to a temperature corresponding to its viscosity of $10^{5.5}$ to $10^7$ dPaS, and is pressed by a molding member whose temperature is kept 100° C. lower than the glass temperature.

However, in the case that the glass material is heated on the holding member to the aforesaid temperature, following problems will arise. The glass deforms into an improper shape when molded, so that a gas remains in a surface pressed, or the holding member intrudes into the glass, so that the optical element cannot attain a necessary accuracy, or when the glass material heated is transferred into the mold, the glass temperature falls to make press molding impossible.

In addition, since the circumferential portion of the glass material held by the holding member contacts with the holding member, its surface becomes rough and difficult to use as an optical functional surface. Further, since the glass is pressed in a state of being placed on the holding member, the positioning becomes difficult and burrs tend to appear on the molded part. Still further, the molded part is adhered to the holding member, and hence it becomes difficult to release it from the mold. Depending upon the shape, such as for a convex lens, the difficulty will increase.

Moreover, Japanese Patent Application Laid-Open No. 62-27334 discloses a method in which a glass material is press-molded while the glass material is heated to a temperature corresponding to a viscosity of $10^6$ to $10^8$ dPaS and the molding members are set to Tg to (Tg-200° C.). Tg is transition temperature. However, since the temperature of the molding members are too low, the glass temperature rapidly decreases when press-molded, with the result that an accuracy necessary for the molded part is unobtainable, besides the pressing is not achievable to produce a predetermined thickness, the glass is broken, or the difference in temperature distribution within the glass takes place, so that the surface of the molded part wrinkles. In addition, as well as the aforesaid well-known example, the problems will occur in carrying out the press molding in a state that the glass material is placed on the holding member.

SUMMARY OF THE INVENTION

The present invention has been made with a view of eliminating the above-mentioned problems, and it is therefore an object of the present invention to provide a molding method for an optical element, which is capable of avoiding the occurrence of cracks and molding failures on a glass-molded product, also shortening the molding cycle, and further performing the molding with optimal condition to contribute to economization.

For this purpose, in the molding method for optical element according to the present invention in which a predetermined amount of glass material is introduced into a mold and subsequently heated, softened and pressed by the mold, the glass material heated to have a viscosity of $10^5$ to $10^7$ dPaS is press-molded in the mold whose temperature corresponds to a viscosity of $10^9$ to $10^{11}$ dPaS.

The reason for specifying the range of the glass viscosity is as follows. When the glass material exceeds a temperature corresponding to a viscosity of $10^5$ dPaS, the glass material deforms during heating to become a shape improper to press molding, or the difference between the temperatures of the central portion and surface portion of the glass is extremely large immediately after the pressing starts, and reaches a level where the sink mark is not removed and hence configuration accuracy is not obtained. On the other hand, when not reaching a temperature equivalent to a viscosity of $10^7$ dPaS, the glass temperature decreases precipitously during pressing, so that its deformation does not occur to produce a predetermined thickness and the configuration accuracy is unobtainable.

When the temperature of the molding members exceeds a temperature equivalent to a viscosity of $10^9$ dPaS of the glass material to be press-molded, fusion between the molding surfaces of the molding members and the glass tends to take place. On the other hand, when not reaching a temperature corresponding to a viscosity of $10^{11}$ dPaS, the glass temperature rapidly lowers too much when pressed, with the result that an accuracy required for the molded part is not obtainable, besides the pressing to a predetermined thickness is impossible, the glass is broken, or variation in temperature distribution within the glass arises due to the rapid temperature drop to create wrinkles on the surface of the molded product.

Accordingly, these problems are solved by setting the above-mentioned temperature conditions. More specifically, the glass material prepared for weight can be pre-heated at a different location to a temperature below a temperature corresponding to a viscosity of $10^{11}$ dPaS, then introduced into the mold, whereby the time needed for the heating of the glass material can be shortened. However, if pre-heated up to a temperature exceeding the glass yield point ($10^{11}$ dPaS), the holding member intrudes into the glass during pre-heating or a conveying member intrudes into the glass when the glass material is introduced into the mold, with the result that the surface of the glass material deteriorates.

Moreover, on press-molding of the glass material, the cooling of the molding members starts at the same time the deformation of the glass material starts, whereby the molding cycle can be shortened as compared with the conventional case that the cooling has been made after the completion of the deformation. In this invention, the mold temperature is within the range corresponding to $10^9$ to $10^{11}$ dPaS, and in the case of the vicinity of $10^9$ dPaS within that range, if the glass whose temperature corresponds to a viscosity of $10^5$ to $10^7$ is press-molded and maintained for a long time, fusion with the molding surfaces of the molding members tends to occur, but the molding members are cooled at the same time the pressing starts, thereby making it possible to prevent the fusion.

In addition, on press-molding of the glass material, the glass material is pressed within 5 seconds until having a predetermined thickness from the start of the deformation, thereby making it possible to obtain a satisfactory configuration accuracy. If it takes more than 5 seconds until the completion of the deformation because of a low load of the pressing machine or the like, the glass temperature decreases precipitously, so that the deformation to a predetermined thickness may become impossible.

Moreover, the glass molded is cooled under pressure until its internal viscosity reaches $10^{11}$ to $10^{13}$ dPaS and then released from the mold, whereby a high-accuracy optical element is obtainable. That is, in the case of a lens with a small diameter, a configuration accuracy may be attainable even if the release from the mold is made at more than a temperature corresponding to a viscosity of $10^{11}$ dPaS. On the other hand, for a lens with a large diameter, when the glass is pressurized for $10^{11}$ to $10^{13}$ dPaS, thereafter, cooled and released from the mold, a higher configuration accuracy is obtainable.

In accordance with the present invention, no glass holding member is used, thus not creating problems such as the occurrence of burrs and the adhesion to the holding member.

DETAILED DESCRIPTION OF THE PREFERRED EMBODIMENTS

First Embodiment

Figure 1:
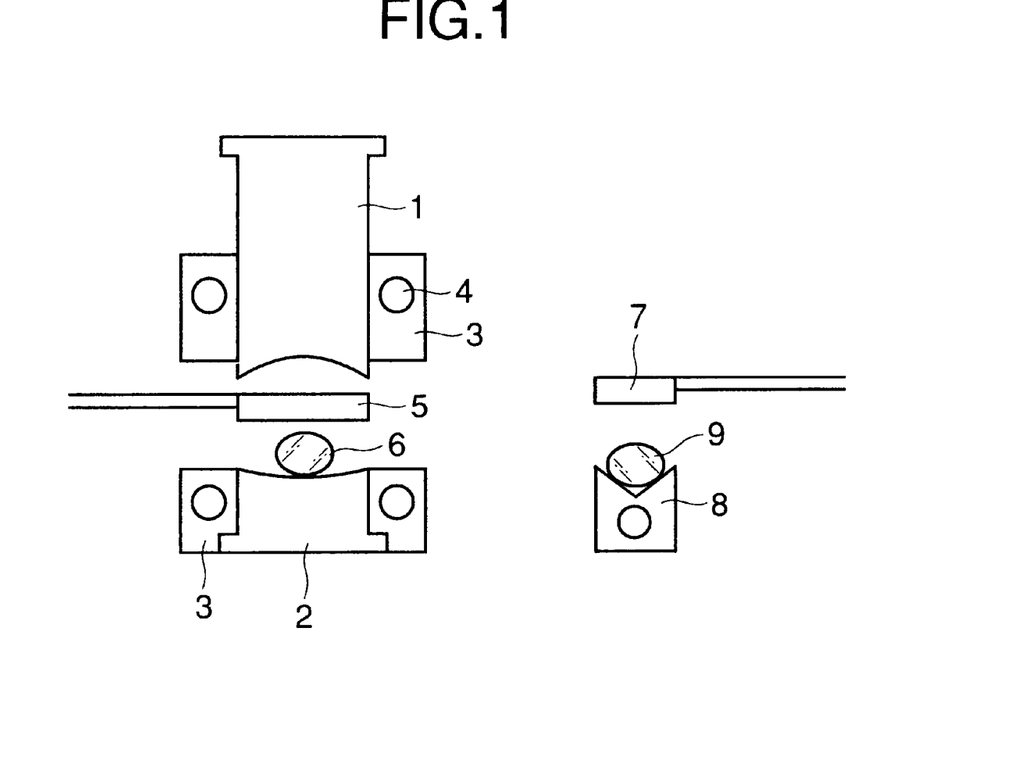
FIG. 1 is a schematic diagram of one example of an apparatus useful for describing a molding method according to an embodiment of the present invention.
Figure 2:
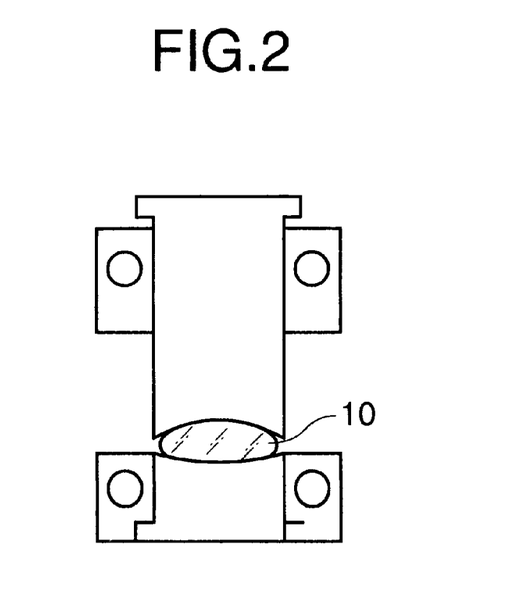
FIG. 2 is a diagram of a state of the apparatus in FIG. 1 after press molding.

FIG. 1 is a schematic illustration of an apparatus for performing a molding method according to the present invention. The apparatus is provided with an upper mold 1, a lower mold 2, a shell mold 3 having openings, a mold heater 4, a glass heater 5, a suction hand 7 for putting and taking a glass material 6 and a molded product in and from a mold, and a pre-heating base 8 used for pre-heating a glass material 9 before introduced into the mold. Further, FIG. 2 illustrates a state after an optical element is molded, where numeral 10 represents a molded product.

The press molding apparatus shown in FIG. 1 is located in an atmosphere of $N_2$ within a molding chamber (not shown). In a concrete example of this embodiment, for molding a lens, SK12 (nd=1.58313, vd=59.4, Tg=506° C., At=538° C.) is used as a glass material, and is molded to produce a gob (glass mass) having a diameter of 12 mm and a central thickness of 7 mm. In this case, the molded product is a biconvex lens having a dimension of R1=16.45 mm, R2=16.86 mm, central thickness=4.5 mm, light beam effective diameter=φ12.5 mm and outer diameter=φ15 mm, produced from the aforesaid glass material. The temperature and corresponding viscosity characteristics of SK12 are shown in Table 1.

TABLE 1

| Viscosity (dPaS) | $10^5$ | $10^6$ | $10^7$ | $10^8$ | $10^9$ | $10^{10}$ | $10^{11}$ | $10^{12}$ | $10^{13}$ |
|---|---|---|---|---|---|---|---|---|---|
| Temperature (° C.) | 720 | 677 | 642 | 612 | 584 | 557 | 535 | 516 | 500 |

Figure 3:
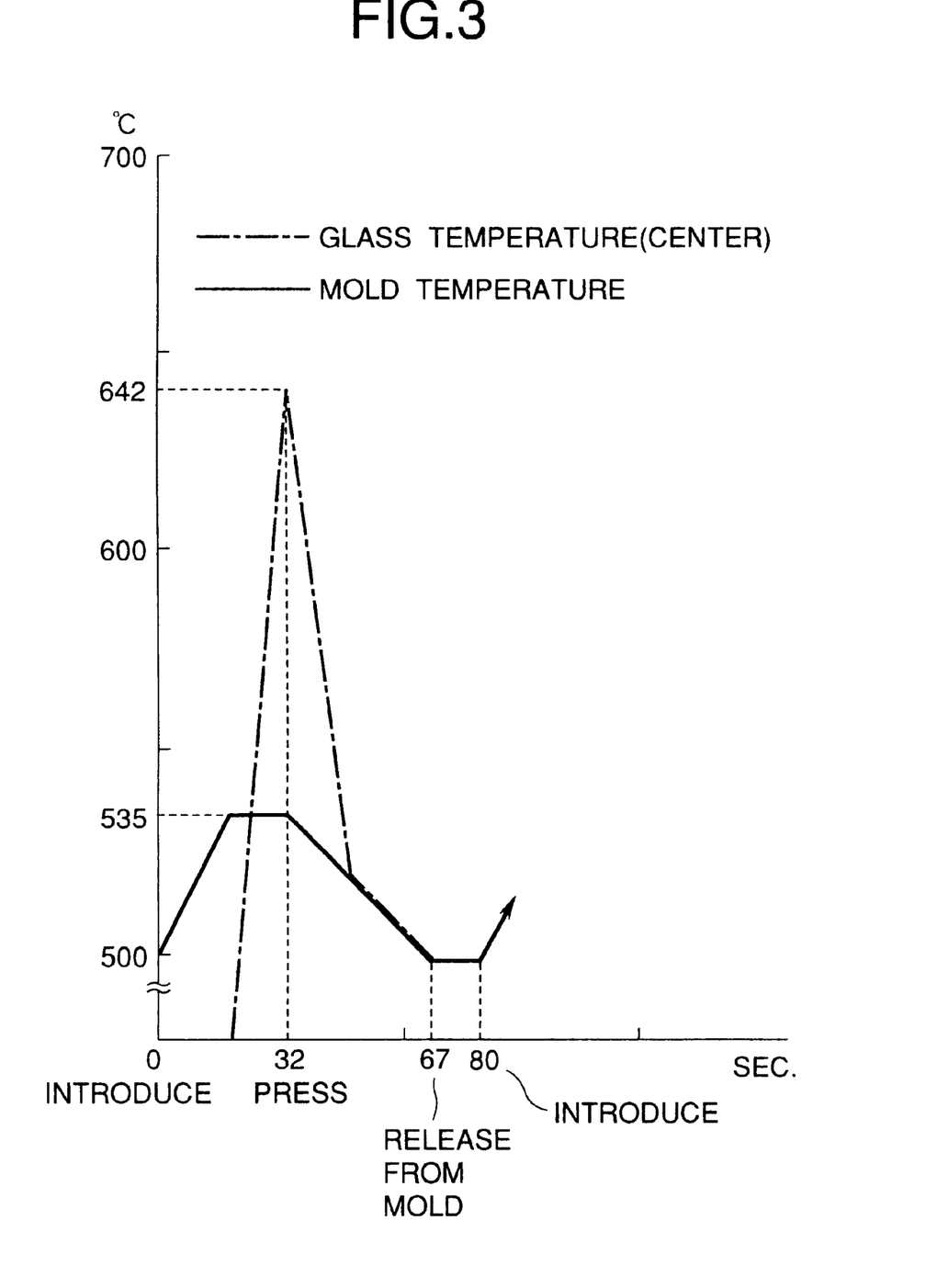
FIG. 3 is a graph for explaining variation in temperature of a mold and a glass concerning one condition in a first embodiment.

FIG. 3 illustrates the temperature variations of a mold and a glass concerning one condition in this embodiment. In the molding process, the predetermined amount glass material is first introduced into the lower mold 2 by means of the suction hand 7. At this time, the temperature of the upper and lower molds 1 and 2 is 500° C. Subsequently, the heater 5 is put between the upper and lower molds 1 and 2 in the vicinity of the glass material 6 to quickly heat the glass material. Simultaneously with the introduction of the glass material, the mold temperature is raised to 535° C. (corresponding to a viscosity of $10^{11}$ dPaS) within 17 seconds. When the central temperature of the glass material 6 reaches 642° C. (corresponding to a viscosity of $10^7$ dPaS), the heater 5 is retracted, then the upper mold 1 is lowered with a load of 100 Kg to perform press-molding. The time taken until the glass material 6 is pressed to produce a predetermined thickness after start of the deformation was 4 seconds. Further, the molds are cooled at a rate of 1° C./second at the same time the pressing starts, and when its temperature reaches 500° C. after 35 seconds, the upper mold 1 is raised and the glass material is released from the mold.

The glass is cooled to the temperature of the mold at the moment when its surface is pressed, whereas its center is cooled later and the center temperature coincides with the surface temperature after the elapse of 15 seconds. The optical element 10 molded shows an excellent configuration accuracy: the number of the contour maps of the surface is only one in terms of the Newton's ring. Further, after the release from the mold, the molded product is taken out, and then new glass material is introduced, and continuous molding could be carried out. The time necessary for one cycle in this continuous molding was 80 seconds.

Figure 4:
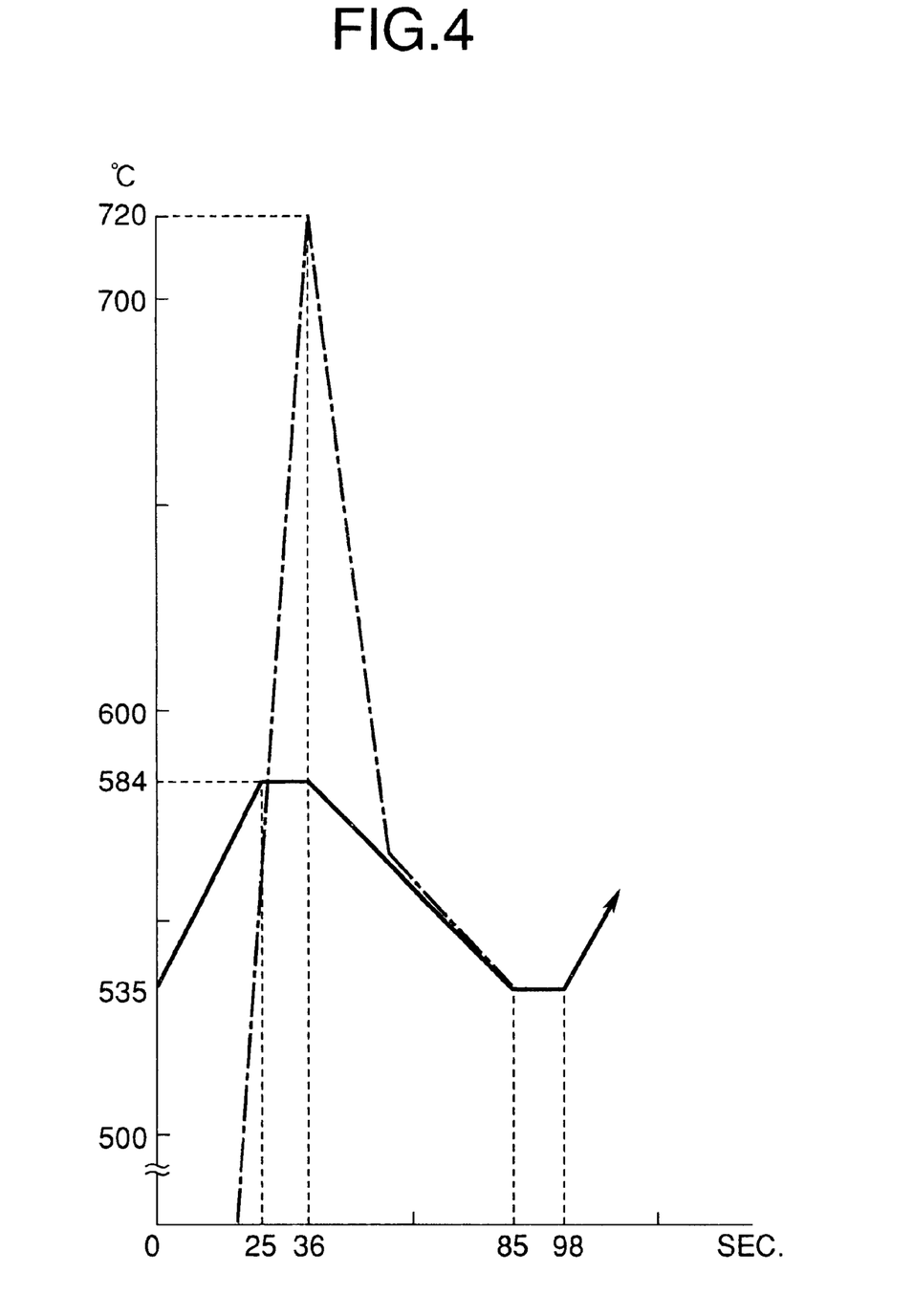
FIG. 4 is a graph for explaining variation in temperature of a mold and a glass concerning a difference condition in the same embodiment.

FIG. 4 illustrates the temperature variations of a mold and a glass concerning another condition. The pressing is made under the conditions that the mold temperature is 584° C. (corresponding to a viscosity of $10^9$ dPaS) and the glass material temperature is 720° C. (equivalent to a viscosity of $10^5$ dPaS), and the release from the mold is made at 535° C. In this case, the cycle time was 98 seconds. In addition, table 2 shows experimental results obtained from a molding test performed by varying the temperatures of the mold and the glass.

TABLE 2

| Glass Mold | $10^5$ 740° C. | $10^6$ 720° C. | $10^7$ 677° C. | $10^8$ 642° C. | 612° C. |
|---|---|---|---|---|---|
| $10^8$ 612° C. | Fusion | Fusion | Fusion | Fusion | Fusion |
| $10^9$ 584° C. | Fusion | OK Contour map of surface 0 | OK Contour map of surface 0 | OK Contour map of surface 0 | Thickness failure |
| $10^{10}$ 557° C. | Fusion | OK Contour map of surface 0 | OK Contour map of surface 0.5 | OK Contour map of surface 0.5 | Thickness failure |
| $10^{11}$ 535° C. | Configuration accuracy failure Wrinkle | OK Contour map of surface 1 | OK Contour map of surface 1 | OK Contour map of surface 1 | Crack |
| $10^{12}$ 516° C. | Configuration accuracy failure Wrinkle | Configuration Wrinkle | Thickness failure | Crack | Crack |

It can be understood from the above results that when the glass temperature corresponds to a viscosity of $10^5$ to $10^7$ dPaS and the mold temperature corresponds to a viscosity of $10^9$ to $10^{11}$ dPaS, an excellent optical element is obtainable.

Second Embodiment

Using a molding apparatus which is the same as that of the first embodiment, an experiment was made on a different condition, and the results of the test were examined. In this case, using the pre-heating base as shown in FIG. 1, a glass material is heated in advance up to 535° C. (corresponding to a viscosity of $10^{11}$ dPaS) and then introduced into a mold. In addition, in the pressing process the next glass material is pre-heated, thus avoiding the cycle extension due to pre-heating and realizing continuous molding.

Figure 6:
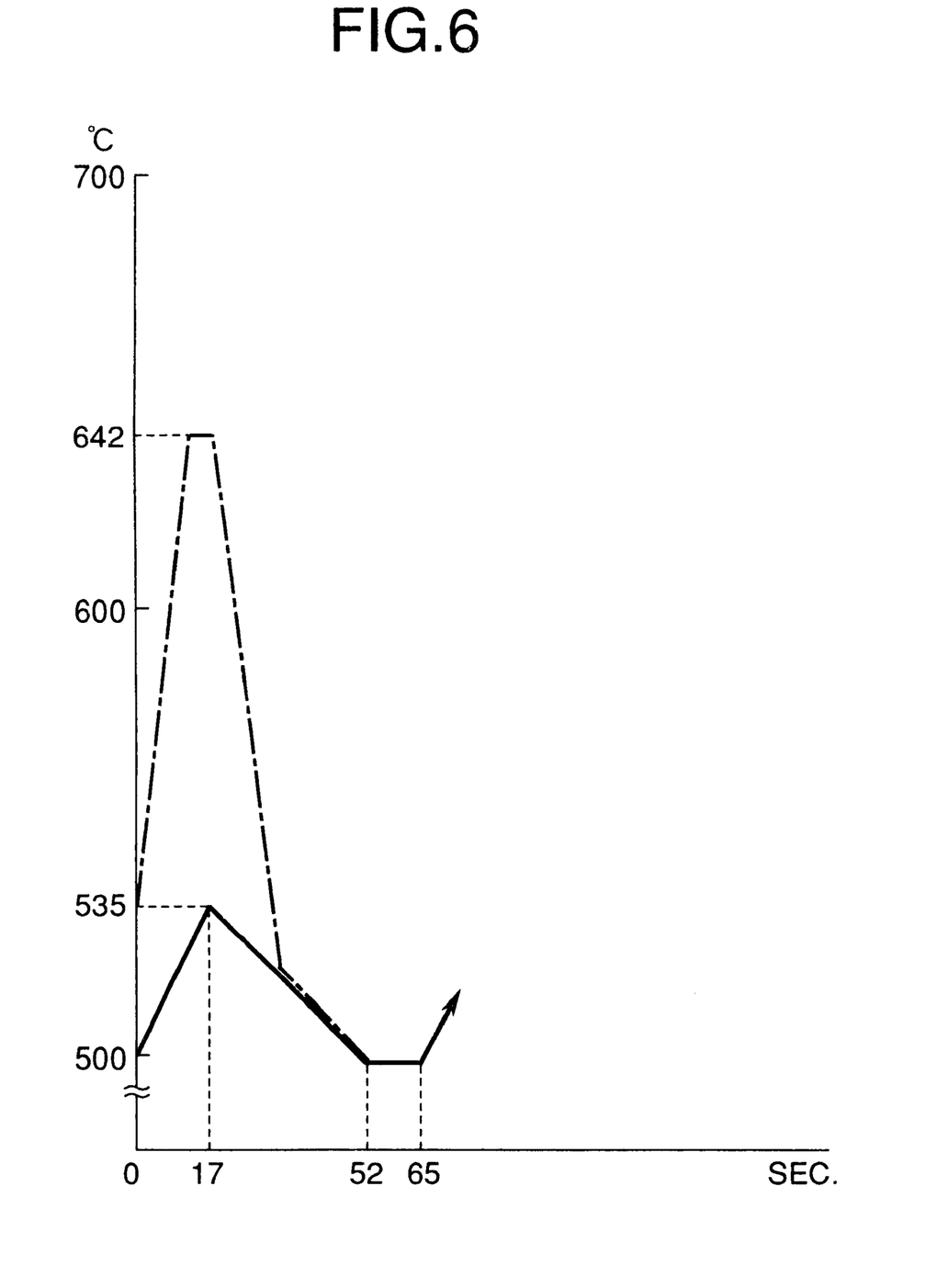
FIG. 6 is a graph for explaining variation in temperature of a mold and a glass in a second embodiment.

FIG. 6 illustrates the temperature variations of the mold and the glass in a concrete example of this embodiment. The glass material pre-heated to 535° C. is introduced into the mold whose temperature is 500° C., and the heater 5 is inserted into the mold to heat the glass. At the same time, the mold is heated to be at 535° C. after elapse of 17 seconds while the temperature of the glass is set to 642° C. In this state, the press molding is made at a pressing pressure of 100 Kg.

The time until pressing the glass material to a predetermined thickness from start of the deformation was 4 seconds. Further, at the same time the pressing starts, the mold is cooled at a rate of 1° C./second, and when reaching 500° C. after 35 seconds, the upper mold 1 is raised to release the glass material from the mold. The optical element 10 thus molded showed an excellent configuration accuracy: the number of contour maps of the surface is 1 in terms of the Newton's ring. Further, the cycle time was 65 seconds, that is, it is shortened by 15 seconds as compared with the first embodiment in which the press molding is made without pre-heating on the same condition.

Table 3 shows the molding results obtained when the molding was made on the same temperature condition by varying pressing pressure.

TABLE 3

| Pressing pressure | 100 kg | 50 kg | 25 kg |
|---|---|---|---|
| Result and deformation time | OK 4 seconds | OK 5 seconds | Thickness failure 7 seconds |

It can be understood from the above results that the glass temperature falls precipitously if the deformation is tried for more than 5 seconds, and hence deformation becomes impossible, making it difficult to produce a predetermined thickness.

Third Embodiment

Figure 7:
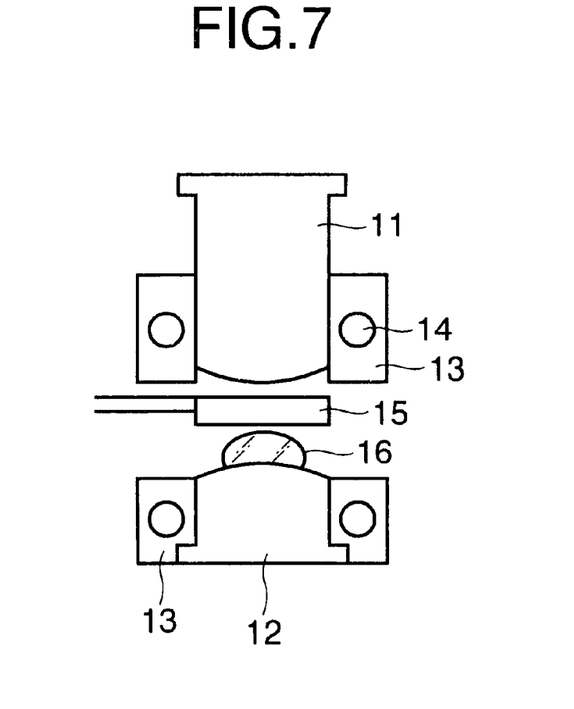
FIG. 7 is a diagram for showing an apparatus for carrying out a molding method according to a third embodiment.
Figure 8:
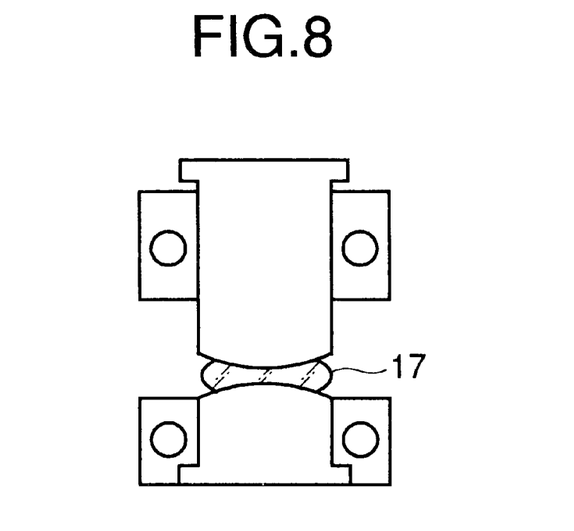
FIG. 8 is a diagram for illustrating a state of the apparatus in FIG. 7 after press molding.

FIG. 7 is a schematic illustration of an apparatus useful for describing a third embodiment of the present invention. The apparatus is provided with an upper mold 11, a lower mold 12, a shell mold 13, a mold heater 14, and a glass heater 15. Numeral 16 designates a glass material. Further, FIG. 8 shows a state after molding of an optical element where numeral 17 indicates a molded product. As the glass material for molding a lens there was used LaK12 (nd=1.66910, vd=55.4, Tg=530° C., At=562° C.), and using this glass material there was manufactured a single-sided concave gob having a diameter of 12.7 mm and a central thickness of 6 mm.

In this instance, using the aforesaid glass material there is produced a biconcave lens having R1=17.58 mm, R2=37.377 mm, central thickness=1.3 mm, light beam effective diameter=12.5 mm and outer diameter=φ14 mm. Table 4 shows the temperature and corresponding viscosity characteristics of LaK12.

TABLE 4

| Viscosity (dPaS) | $10^5$ | $10^6$ | $10^7$ | $10^8$ | $10^9$ | $10^{10}$ | $10^{11}$ | $10^{12}$ | $10^{13}$ |
|---|---|---|---|---|---|---|---|---|---|
| Temperature (° C.) | 706 | 666 | 636 | 612 | 587 | 567 | 549 | 531 | 513 |

Figure 9:
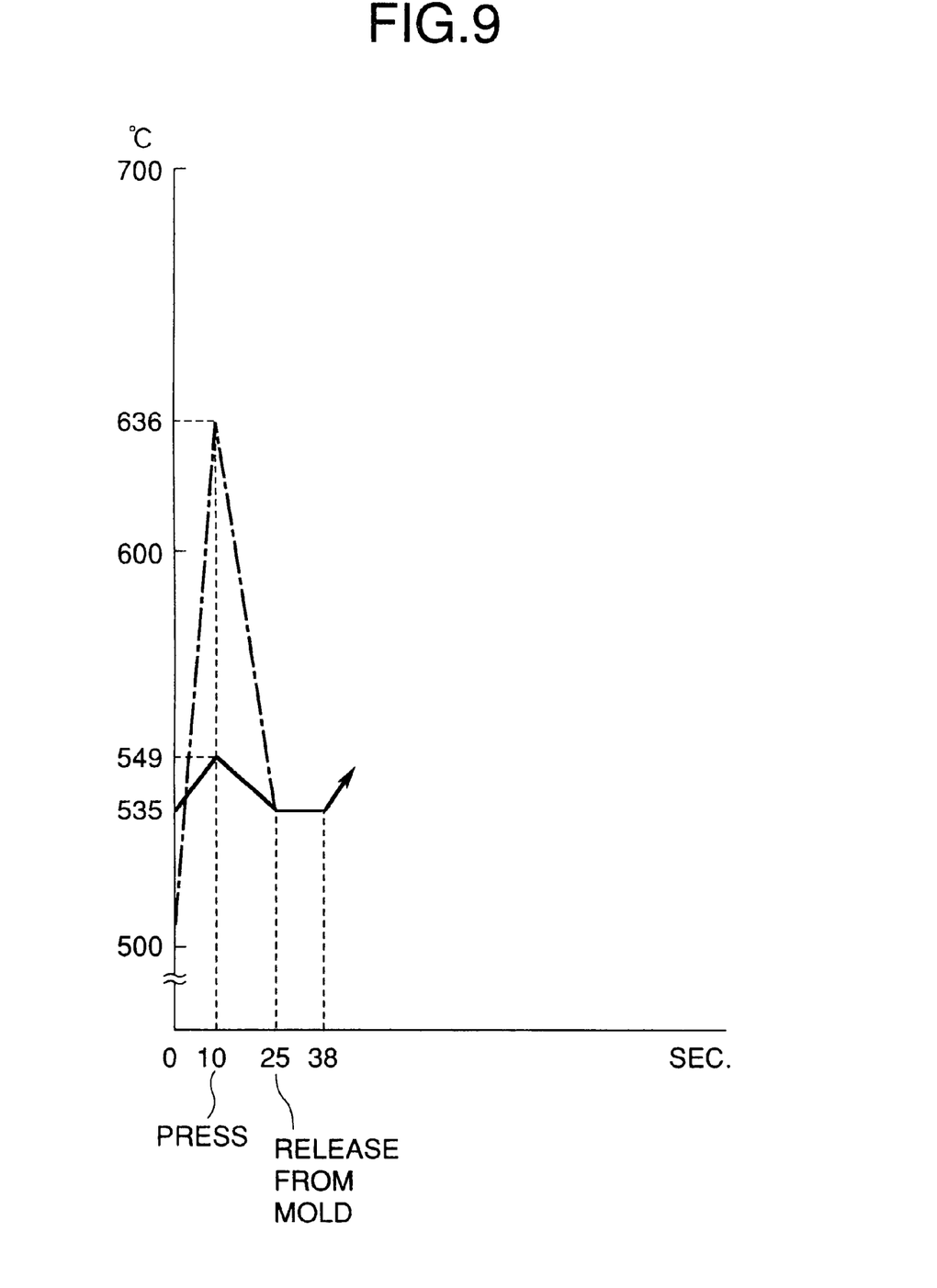
FIG. 9 is a graph for explaining variation in temperature of a mold and a glass concerning one condition in the third embodiment.

FIG. 9 illustrates the temperature variations of a mold and a glass concerning one condition in this embodiment. In the molding process, a glass material pre-heated to 513° C. (corresponding to a viscosity of $10^{13}$ dPaS) on a pre-heating base is introduced into a mold with a temperature of 535° C. and then the heater 15 is inserted therein to heat the glass material. At the same time, the mold temperature is raised to 549° C. (corresponding to a viscosity of $10^{11}$ dPaS), and when the glass temperature reaches 636° C. (corresponding to a viscosity of $10^7$ dPaS), the heater 15 is retracted, and subsequently the upper mold 11 is lowered at a pressing pressure of 80 Kg to press the glass material.

Furthermore, simultaneously with the start of the pressing, the mold is cooled at a rate of 1° C./second, and when its temperature reaches 535° C. after 15 seconds, the upper mold 11 is lifted to release the glass material from the mold. The glass is cooled to the temperature of the mold at the moment its surface is pressed, while the thickest portion is cooled later, so that its temperature coincides with the surface temperature after 14 seconds. The molded optical element 17 showed an excellent configuration accuracy: the number of the contour maps of the surface is 1.5 in terms of the Newton's ring. Further, after release from the mold, it is possible to take out the molded product and to introduce a new glass material, thus continuously performing the molding. This cycle time was 38 seconds.

Table 5 shows the molding results obtained by varying the temperatures of the mold and the glass varies.

TABLE 5

| Glass Mold | 720° C. | $10^5$ 706° C. | $10^6$ 666° C. | $10^7$ 636° C. | $10^8$ 612° C. |
|---|---|---|---|---|---|
| $10^8$ 612° C. | Fusion | Fusion | Fusion | Fusion | Fusion |
| $10^9$ 587° C. | Fusion | OK Contour map of surface 0 | OK Contour map of surface 0.5 | OK Contour map of surface 0.5 | Thickness failure |
| $10^{10}$ 567° C. | Fusion | OK Contour map of surface 0.5 | OK Contour map of surface 1 | OK Contour map of surface 1 | Thickness failure |
| $10^{11}$ 549° C. | Configuration accuracy failure Wrinkle | OK Contour map of surface 1 | OK Contour map of surface 1.5 | OK Contour map of surface 1.5 | Thickness failure |
| $10^{12}$ 531° C. | Configuration accuracy Wrinkle | Configuration failure Wrinkle | Thickness failure | Thickness failure | Crack |

It can be understood from the above results that an excellent optical element is obtainable when the glass temperature corresponds to a viscosity of $10^5$ to $10^7$ dPaS and the mold temperature corresponds to a viscosity of $10^9$ to $10^{11}$ dPaS.

Comparative Example

Figure 5:
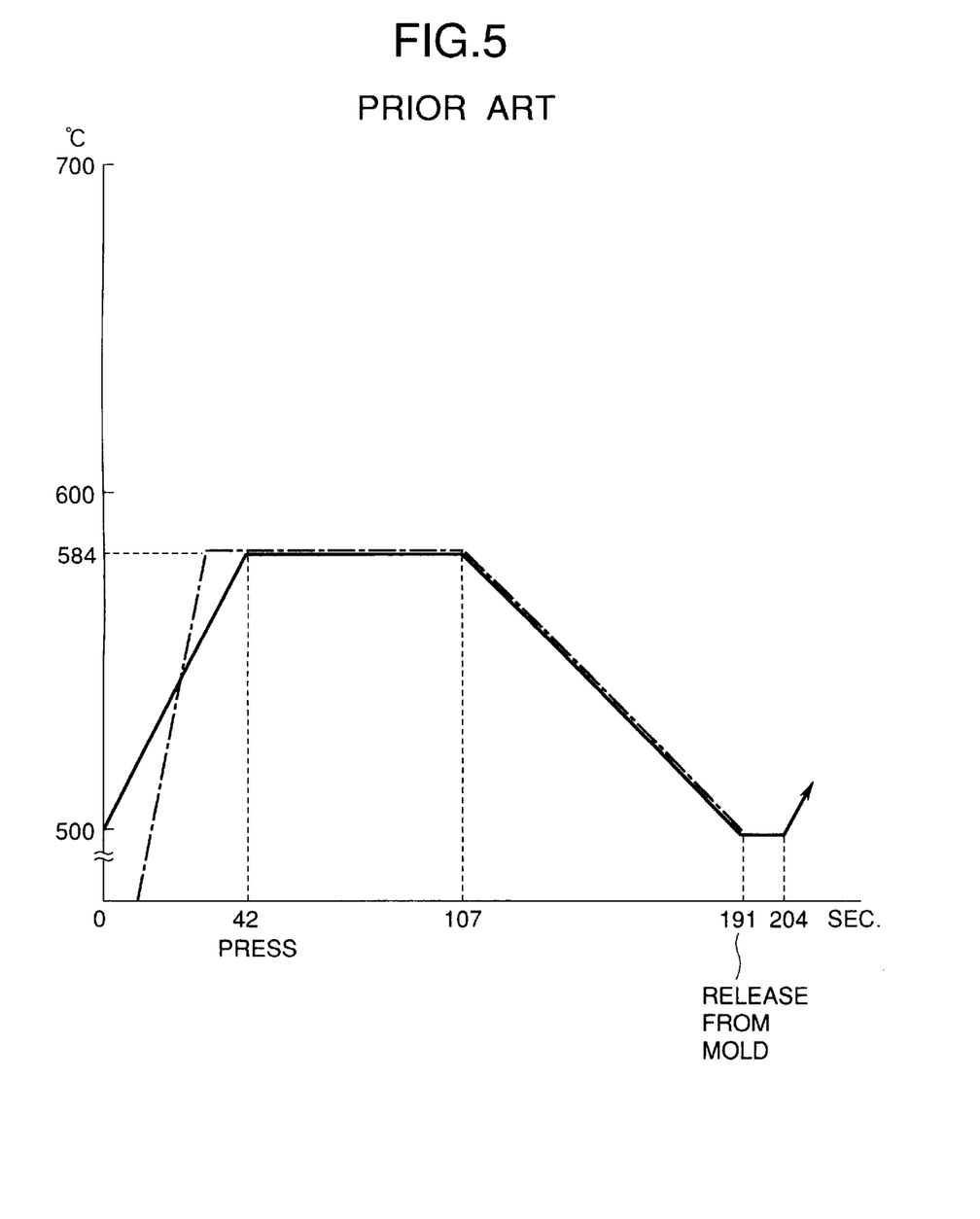
FIG. 5 is a graph for explaining variation in temperature of a mold and a glass in a prior molding method.

Using an apparatus including a mold which is the same as that in the first embodiment, a prior molding process is described as a comparative example. FIG. 5 shows the temperature variations of a mold and a glass in the prior example. When the mold temperature is 500° C., a glass material (SK12) is introduced into the mold. When the mold and the glass respectively reach a temperature of 584° C. (corresponding to a viscosity of $10^9$ dPaS) after elapse of 42 seconds from the introduction, the upper mold is lowered to press the glass. In this case, it takes 65 seconds until the completion of its deformation. Thereafter, the mold is cooled at a rate of 1° C./second, and when its temperature reaches 500° C. after 84 seconds, the upper mold is lifted to release the glass from the mold. After release from the mold, the molded product is taken out and subsequently a new glass material is introduced thereinto to perform continuous molding. The cycle time is 204 seconds, and as compared with the cycle time in the embodiments of this invention, it is significantly long.

As described above, in a method in which a glass material prepared for weight is introduced into a mold and then heated to be softened and pressed in the mold to produce an optical element, the glass material is heated to have a viscosity of $10^5$ to $10^7$ dPaS, and is pressed with the mold heated to a temperature corresponding to a viscosity of $10^9$ to $10^{11}$ dPaS. Thus, an optical element with an excellent quality can be molded for a time shorter than that of the prior art, thus contributing to the improvement of economization.

What is claimed is:

1. An optical element molding method in which a predetermined amount of glass material is introduced into a mold, and then heated, softened, and pressed with said mold, said method comprising the steps of:

heating the glass material so that the glass material has a viscosity of $10^5$ to $10^7$ dPaS; and deforming the glass material with the mold whose temperature corresponds to a viscosity of $10^9$ to $10^{11}$ dPaS of the glass material, wherein said deforming is effected by such a press pressure as to finish said deforming of the glass material within five seconds.

2. A method according to claim 1, further comprising the steps of:

pre-heating the predetermined amount of glass material to a temperature below a temperature corresponding to a viscosity of $10^{11}$ dPaS; and introducing the glass material into the mold, and heating the glass material to a predetermined temperature to soften the glass material, and performing said deforming by the mold.

3. An optical element molding method in which a predetermined amount of glass material is introduced into a mold, and then heated, softened, and pressed with said mold, said method comprising the steps of:

heating the glass material so that the glass material has a viscosity of $10^5$ to $10^7$ dPaS; and deforming the glass material with the mold whose temperature corresponds to a viscosity of $10^9$ to $10^{11}$ dPaS of the glass material, wherein said deforming is effected by such a press pressure as to finish said deforming of the glass material within five seconds, and wherein during said deforming, the mold starts to be cooled at the same time the glass material starts to be deformed.

4. A method according to claim 1, wherein the glass material is pressed to have a predetermined thickness within 5 seconds from starting of deformation of the glass material during said deforming, and subsequently cooled under pressing pressure until an internal viscosity of the glass material reaches $10^{11}$ to $10^{13}$ dPaS, thereafter released from the mold.

* * * * *

UNITED STATES PATENT AND TRADEMARK OFFICE
CERTIFICATE OF CORRECTION

PATENT NO. : 6,003,338

DATED : December 21, 1999

INVENTOR(S) : YAMAMOTO, et al.

It is certified that error appears in the above-identified patent and that said Letters Patent is hereby corrected as shown below:

COLUMN 1:
 Line 63, "contain" should read --contains--.
 Line 66, "other," should read --others,--.

COLUMN 2:
 Line 25, "following" should read --the following--.
 Line 49, "are" should read --is--.

COLUMN 3:
 Line 1, "condition" should read --conditions--.
 Line 3, "for" should read --for an--.

COLUMN 5:
 Line 21, "amount glass material" should read --amount of glass material 6--.

Signed and Sealed this

Twenty-second Day of May, 2001

Attest:

NICHOLAS P. GODICI

Attesting Officer        Acting Director of the United States Patent and Trademark Office